United States Patent
Atsumi et al.

(10) Patent No.: US 6,497,319 B2
(45) Date of Patent: Dec. 24, 2002

(54) WORK TRANSFER APPARATUS

(75) Inventors: Kiminori Atsumi, Tokyo-To (JP); Yasuo Matsuoka, Tokyo-To (JP)

(73) Assignee: Tokyo Weld Co., Ltd., Tokyo (JP)

( * ) Notice: Subject to any disclaimer, the term of this patent is extended or adjusted under 35 U.S.C. 154(b) by 0 days.

(21) Appl. No.: 09/986,760

(22) Filed: Nov. 9, 2001

(65) Prior Publication Data

US 2002/0102157 A1 Aug. 1, 2002

(30) Foreign Application Priority Data

Nov. 10, 2000 (JP) ........................................ 2000-343753

(51) Int. Cl.[7] ................................................ B65G 29/00
(52) U.S. Cl. .................................. 198/463.4; 198/459.6
(58) Field of Search ............................. 198/459.6, 463.4

(56) References Cited

U.S. PATENT DOCUMENTS

| | | | | |
|---|---|---|---|---|
| 5,152,390 A | * | 10/1992 | Kubota et al. ............ | 198/463.4 |
| 5,167,316 A | * | 12/1992 | Kaminski .................... | 198/408 |
| 5,301,792 A | * | 4/1994 | Spatafora et al. ........... | 198/408 |
| 5,950,801 A | * | 9/1999 | Vroomans ................ | 198/345.2 |

* cited by examiner

*Primary Examiner*—Kathy Matecki
*Assistant Examiner*—Michael J. Kwon
(74) *Attorney, Agent, or Firm*—Birch, Stewart, Kolasch & Birch, LLP

(57) ABSTRACT

A work transfer apparatus is equipped with a work feeder 23, a rotatable turn table 11 formed several work-storing pockets 11a at its outer periphery and a separation mechanism 24 provided between the work feeder 23 and the turn table 11. The separation mechanism 24 has a communicating passage 24a. A work detector (15a, 15b) is provided in the work-storing pocket 11a. A work stopper 14 is provided at the work feeder 23 on an upstream side of the work detector (15a, 15b), for separating a preceding work $W_1$ and the succeeding work $W_2$.

11 Claims, 2 Drawing Sheets

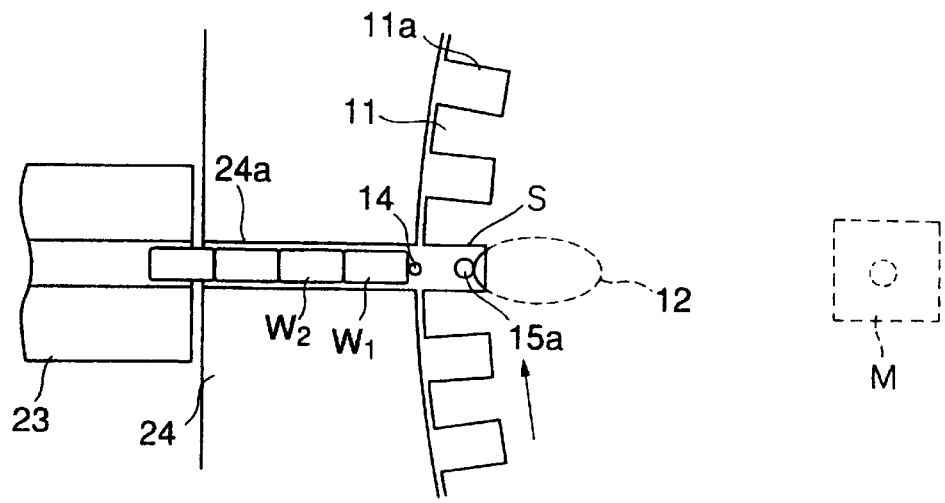
F I G. 1
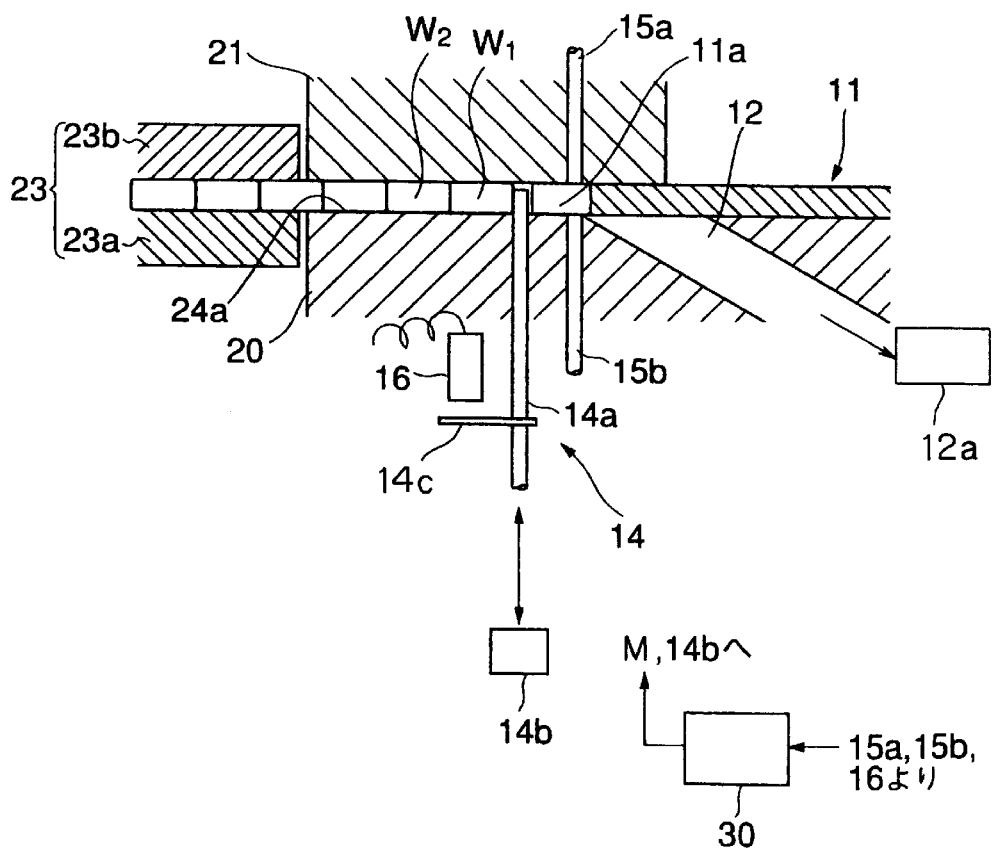
F I G. 2

WORK TRANSFER APPARATUS

BACKGROUND OF THE INVENTION

The present invention relates to a work transfer apparatus for separating several works fed sequentially and transferring them one by one.

BACKGROUND ART OF THE INVENTION

A known work transfer apparatus for transferring works such as IC chips on which electronic components are integrated, or electronic chips like a resistance, a condenser, or an inductor, is equipped with a work feeder for feeding works, a turn table formed with work-storing pockets at its outer periphery and a separation mechanism provided between the work feeder and the turn table.

Several works are sequentially fed by the work feeder and separated by the separation mechanism. The works are once stored in the work-storing pockets one by one and transferred to the next stage.

It is highly required that the works be completely separated from each other by the separation mechanism before being stored in the work-storing pockets because they are touching each other when sequentially fed by the work feeder.

Powder dust will be generated from, for example, electronic components vulnerable to friction when the components are separated by being pressed onto the passage wall or suction in a separation mechanism. Such powder dust attached on electrodes of the components could cause inferior conductivity after several processes and soil the components or any mechanism they are fed.

SUMMARY OF THE INVENTION

In view of the problems discussed above, a purpose of the present invention is to provide a work transfer apparatus with a separation mechanism in which works suffer the minimum friction during pressure- or suction-separation, the completely separated works being promptly transferred into work-storing pockets.

The present invention provides a work transfer apparatus including: a work feeder for feeding a plurality of works; a rotatable turn table with a plurality of work-storing pockets at the outer periphery of the turn table; and a separation mechanism provided with a communicating passage extending between the work feeder and the turn table, wherein the turn table is rotated by a driver to shift the work-storing pockets at a work-receiving position one by one, the work-receiving position facing the communicating passage, a suction opening being provided in the vicinity of the turn table so that the suction opening communicates with the work-storing pocket located at the work-receiving position, a work detector is provided in the vicinity of the turn table, for detecting the work stored in the work-storing pocket located at the work-receiving position; and a work stopper provided on the communication passage of the separation mechanism on an upstream side of the work detector, the work stopper being able to protrude into and be retracted from the communication passage, the work stopper being driven by a controller based on a signal from the work detector.

The work stopper may be provided along the communicating passage of the separation mechanism and in the vicinity of the outer periphery of the turn table.

The work stopper may include a separating pin and a pin-driving mechanism, the separating pin protruding into and being retracted from the communicating passage of the separation mechanism in the vicinity of the turn table by the pin-driving mechanism under control of the controller.

The work transfer apparatus may further include a pin detector in the vicinity of the separating pin, for detecting the separating pin while protruding into and being retracted from the communicating passage of the separation mechanism, the controller controlling the driver to rotate the turn table based on a signal from the pin detector.

In the work transfer apparatus, the work detector may include a photo emitter provided at a wall of the work-storing pocket at base or cover side and a photo receptor provided at an opposing wall of the work-storing pocket.

In the work transfer apparatus, in response to the signal from the work detector, the controller may drive the work stopper to protrude into the communication passage to separate the work in the work-storing pocket from other works when the work has been stored in the work-storing pocket located at the work-receiving position, whereas the controller may drive the work stopper to be retracted from the communication passage when no works have been stored in the work-storing pocket located at the work-receiving position.

In the work transfer apparatus, the separation mechanism and the turn table may be supported by a supporting base, and enclosed by a cover.

In the work transfer apparatus, the work stopper may include a separating pin provided on the supporting base or the cover, the separating pin being able to protrude into and be retracted from the communicating passage.

In the work transfer apparatus, the work detector may include a photo emitter provided at either the supporting base or the cover and a photo receptor provided at the other of the supporting base and the cover.

In the work transfer apparatus, the controller may halt the driver based on a signal from the pin detector when the separating pin has not protruded enough into the communicating passage.

In the work transfer apparatus, the pin detector may operate when a protrusion attached to the separating pin comes close to the pin detector.

According to the present invention, several works fed by the work feeder are sequentially transferred through the communicating passage. The preceding work is stopped by the separating pin of the work stopper stuck into the communicating passage. The separating pin is then retracted from the communicating passage so that the preceding work is stored in a work-storing pocket located at the receiving position on the turn table due to a negative pressure caused by suction through the suction opening. The work stopper is operated by the controller based on a signal from the work detector so that the separating pin is stuck into the communicating passage again to stop the succeeding work.

BRIEF DESCRIPTION OF DRAWINGS

FIG. 1 is a plan view showing an embodiment of a work transfer apparatus according to the present invention;

FIG. 2 is a sectional view showing the embodiment of a work transfer apparatus according to the present invention.

DETAILED DESCRIPTION OF PREFERRED EMBODIMENTS

Figure 3A:
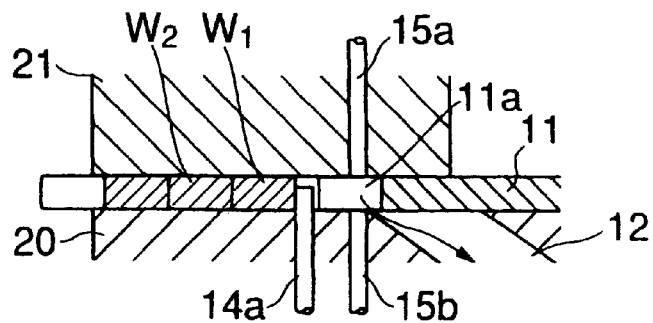
FIG. 3(*a*)–FIG. 3(*d*) are views illustrating an operation of the embodiment of a work transfer apparatus according to the present invention.

A preferred embodiment according to the present invention will be disclosed with reference to the attached drawings.

FIGS. 1 to 3 show an embodiment of a work transfer apparatus according to the present invention.

In FIGS. 1 and 2, a work transfer apparatus is equipped with a work feeder 23 for sequentially feeding several works $W_1, W_{21}, \ldots$, such as IC chips, a rotatable turn table 11 with several work-storing pockets 11a at its outer periphery for storing the works $W_1, W_2, \ldots$, and a separation mechanism 24 provided between the work feeder 23 and the turn table 11.

The work feeder 23 is supported on a support base 23a and enclosed by a cover 23b, for sequentially feeding the works $W_1, W_2, \ldots$, so that they are aligned towards the separation mechanism 24. The separation mechanism 24 has a communicating passage 24a extending between the work feeder 23 and the turntable 11. The separation mechanism 24 and the turn table 11 are supported on a support base 20 and enclosed by a cover 21.

The turn table 11 is rotated by a drive motor M (driver) so that the work-storing pockets 11a are shifted to a receiving position S one by one to face the communicating passage 24a. The works $W_1, W_2, \ldots$, sequentially stored in the work-storing pockets 11a at the receiving position S are transferred one by one in the direction of circumference while the turn table 11 is rotating, for electrical and appearance inspections, etc.

The support base 20 is provided with a suction opening 12 communicated with the work-storing pockets 11a, through which a pocket 11a located at the receiving position S is vacuumed out by a vacuum generator 12a.

A work detector equipped with a photo receptor 15a and a photo emitter 15b is provided in the work-storing pocket 11a located at the position S, for detecting the works $W_1, W_2, \ldots$, stored in the work-storing pocket 11a. The photo emitter 15b and the photo receptor 15a are provided on the walls of each work-storing pocket 11a on the side of the cover 21 and on the side of the support base 20, respectively, without protruding into the pocket 11a so that each work will not touch photo receptor 15a nor the photo emitter 15b.

A work stopper 14 is provided on an upstream side of the work detector (15a, 15b), and includes a separating pin 14a. In detail, the work stopper 14 is provided on the bottom of the communicating passage 24a of the support base 20 and in the vicinity of outer periphery of the turn table 11. The work stopper 14 can protrude into and be retracted from the communicating passage 24a. This movement of the work stopper 14 is detected by a pin detector 16 provided along the separating pin 14a. The separating pin 14a is driven by a drive mechanism 14b so that it protrudes into the communicating passage 24a close to the outer periphery of the turn table 11 to separate the preceding first work $W_1$ and the succeeding second work $W_2$.

Signals from the work detector (15a, 15b) and the pin detector 16 are sent to a controller 30 for controlling the drive mechanism 14b and the drive motor M to drive the work stopper 14 and the turn table 11, respectively.

An operation of the work transfer apparatus as described above will be disclosed with reference to FIGS. 1, 2 and 3(a) to 3(d).

The works $W_1, W_2, \ldots$, are sequentially fed into the communicating passage 24a of the separation mechanism 24 by the work feeder 23. The preceding first work $W_1$ is then stopped by the separating pin 14a protruding into the passage 24a, as shown in FIG. 3(a).

After the controller 30 has acknowledged that no work has been stored in the work-storing pocket 11a located at the receiving position S in response to a signal from the work detector (15a, 15b), the separating pin 14a is moved downwards and retracted from the communicating passage 24a by the drive mechanism 14b controlled by the controller 30.

Figure 3B:
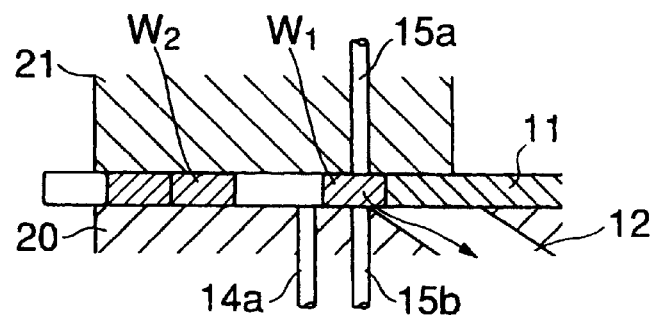

The first work $W_1$ is then sucked rapidly by the vacuum generator 12a through the suction opening 12 and stored in the work-storing pocket 11a located at the receiving position S. The succeeding second work $W_2$ will not be sucked because a suction force through the suction opening 12 for the second work $W_2$ is weaken by the existence of the first work $W_1$, as shown in FIG. 3(b).

Figure 3C:
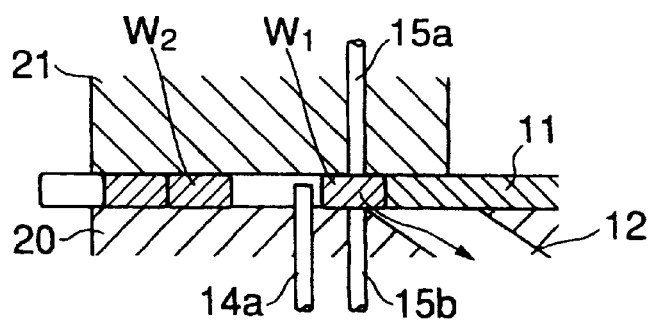

The work detector (15a, 15b) detects the first work $W_1$ stored in the work-storing pocket 11a. In response to a signal from the work detector (15a, 15b), the controller 30 controls the drive mechanism 14b so that the separating pin 14a is moved upwards and protrude into the communicating passage 24a, as shown in FIG. 3(c).

The separating pin 14a protruding into the communicating passage 24a is detected by the pin detector 16 when a protrusion 14c of the separating pin 14a comes close to the pin detector 16.

In response to a signal from the pin detector 16, the controller 30 determines that the separating pin 14a has accurately protruded into the communicating passage 24a.

Figure 3D:
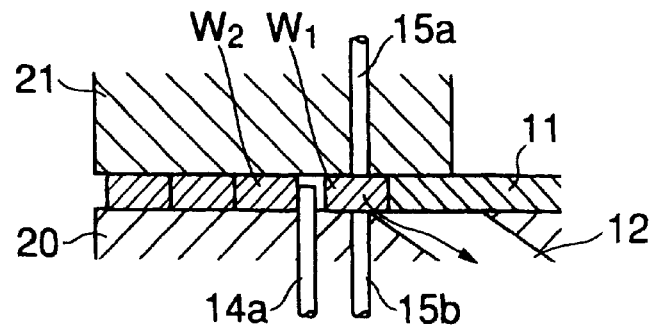

After the second work $W_2$ has been stopped by the separating pin 14a, the controller 30 controls the drive motor M to rotate the turn table 11 by one pitch, as shown in FIG. 3d.

As disclosed, the first work $W_1$ and the succeeding second work $W_2$ are completely separated from each other by the separating pin 14a of the work stopper 14 since the separating pin 14a has protruded into the communicating passage 24a.

When the separating pin 14a cannot fully protrude into the communicating passage 24a because it has touched any work $W_1, W_2, \ldots$, the controller 30 determines that there is abnormality in work separation based on a signal from the pin detector 16 and brings the work transfer apparatus to a halt, or stops the drive motor M and drive mechanism 14b.

According to the embodiment disclosed above, the works $W_1, W_2, \ldots$, fed into the communicating passage 24a of the separation mechanism 24, in tight contact, are completely separated from each other and stored into the work-storing pockets 11a one by one.

The preceding first work $W_1$ is once stopped in front of the work-storing pocket 11a before being stored into the pocket 11a, by the separating pin 14a of the work stopper 14 provided in the vicinity of the outer periphery of the turn table 11. This action protects the work $W_1$ from damage because it will not strongly collide with the wall of the work-storing pocket 11a when stored.

As disclosed, according to the present invention achieves that several works sequentially fed into the separation mechanism can be completely separated from each other preventing generation of powder dust due to frication occurred, and they can be fed through the communicating passage and rapidly stored into the work-storing pockets one by one on the turn table.

What is claimed is:

1. A work transfer apparatus, comprising:
   a work feeder for feeding a plurality of works;
   a rotatable turn table having a plurality of work-storing pockets at an outer periphery of the turn table;
   a separation mechanism provided with a communicating passage extending between the work feeder and the turn table, wherein the turn table is rotated by a driver to shift the work-storing pockets at a work-receiving position one by one, the work-receiving position facing the communicating passage, a suction opening being provided in the vicinity of the turn table so that the suction opening communicates with a work-storing pocket located at the work-receiving position, a work detector provided in the work-storing pocket, for detecting work stored in the work-storing pocket;

a work stopper provided on the communicating passage of the separation mechanism on an upstream side of the work detector, the work stopper being able to protrude into and be retracted from the communicating passage, the work stopper being driven by a controller based on a first signal from the work detector.

2. The work transfer apparatus according to claim 1, wherein the work stopper is provided along the communicating passage of the separation mechanism and in the vicinity of the outer periphery of the turn table.

3. The work transfer apparatus according to claim 2, wherein the work stopper includes a separating pin and a pin-driving mechanism, the separating pin protruding into and being retracted from the communicating passage of the separation mechanism in the vicinity of the turn table by the pin-driving mechanism under control of the controller.

4. The work transfer apparatus according to claim 3, further comprising a pin detector in the vicinity of the separating pin, for detecting the separating pin while the separating pin protrudes into and is retracted from the communicating passage of the separation mechanism, the controller controlling the driver to rotate the turn table based on a second signal from the pin detector.

5. The work transfer apparatus according to claim 1, wherein the work detector includes a photo emitter provided at a wall of the work-storing pocket and a photo receptor provided at an opposing wall of the work-storing pocket.

6. The work transfer apparatus according to claim 1, wherein, in response to the first signal from the work detector, the controller drives the work stopper to protrude into the communicating passage to separate the work in the work-storing pocket from other works when the work has been stored in the work-storing pocket located at the work-receiving position, whereas the controller drives the work stopper to be retracted from the communicating passage when no works have been stored in the work-storing pocket located at the work-receiving position.

7. The work transfer apparatus according to claim 1, wherein the separation mechanism and the turn table are supported by a supporting base, and enclosed by a cover.

8. The work transfer apparatus according to claim 7, wherein the work stopper includes a separating pin provided on the supporting base or the cover, the separating pin being able to protrude into and be retracted from the communicating passage.

9. The work transfer apparatus according to claim 7, wherein the work detector includes a photo emitter provided at either the supporting base or the cover and a photo receptor provided at the other of the supporting base and the cover.

10. The work transfer apparatus according to claim 4, wherein the controller halts the driver based on a signal from the pin detector when the separating pin has not protruded enough into the communicating passage.

11. The work transfer apparatus according to claim 4, wherein the pin detector operates when a protrusion attached to the separating pin comes close to the pin detector.

* * * * *